United States Patent [19]

McIntosh, deceased

[11] 4,294,439
[45] Oct. 13, 1981

[54] SPRING SHACKLE

[75] Inventor: Lester A. McIntosh, deceased, late of Grosse Pointe Shores, Mich., by Detroit Bank & Trust Co., executor

[73] Assignee: McIntosh Corporation, Detroit, Mich.

[21] Appl. No.: 28,561

[22] Filed: Apr. 9, 1979

[51] Int. Cl.³ .............................................. F16F 1/26
[52] U.S. Cl. .................................. 267/54 A; 228/144
[58] Field of Search .......................... 267/54 R, 54 A; 29/175 A; 228/144, 152, 173 C; 138/162, 166, 169, 170, 171

[56] References Cited

U.S. PATENT DOCUMENTS

| | | | |
|---|---|---|---|
| 1,180,859 | 4/1916 | LeFever | 228/144 |
| 1,608,905 | 11/1926 | Murray et al. | 228/144 |
| 1,830,814 | 11/1931 | Thiry | 267/54 A |
| 1,961,536 | 6/1934 | Thiry | 267/54 A |
| 2,140,803 | 12/1938 | Leighton | 267/54 R |
| 2,706,328 | 4/1955 | Karmazin | 228/144 |
| 3,030,101 | 4/1962 | McIntosh | 267/54 A |

FOREIGN PATENT DOCUMENTS 899333 10/1953 Fed. Rep. of Germany ...... 228/144
732436 6/1955 United Kingdom ............. 267/54 A Primary Examiner—Edward R. Kazenske
Attorney, Agent, or Firm—Harness, Dickey & Pierce

[57] ABSTRACT

There is disclosed a novel spring shackle for pivotally supporting one end of a spring on a vehicle frame and having a body member with a central portion and two end portions, one end portion being attached to the spring or frame member, the other end portion being tapered and bent in a helical fashion and having an end received in a recess in the end portion to provide a cylinder having a substantially continuous inner surface of generally uniform radius. Press fit in the cylinder is an elastomeric bushing having a metallic sleeve press fit therein. A novel method of making a shackle is also disclosed, the method comprising the steps of providing a body member with a central portion and two end portions, one of which is formed into a cylinder, inserting an elastomeric bushing into the cylinder in a press fit and then press fitting a metallic sleeve into the elastomeric bushing.

10 Claims, 6 Drawing Figures

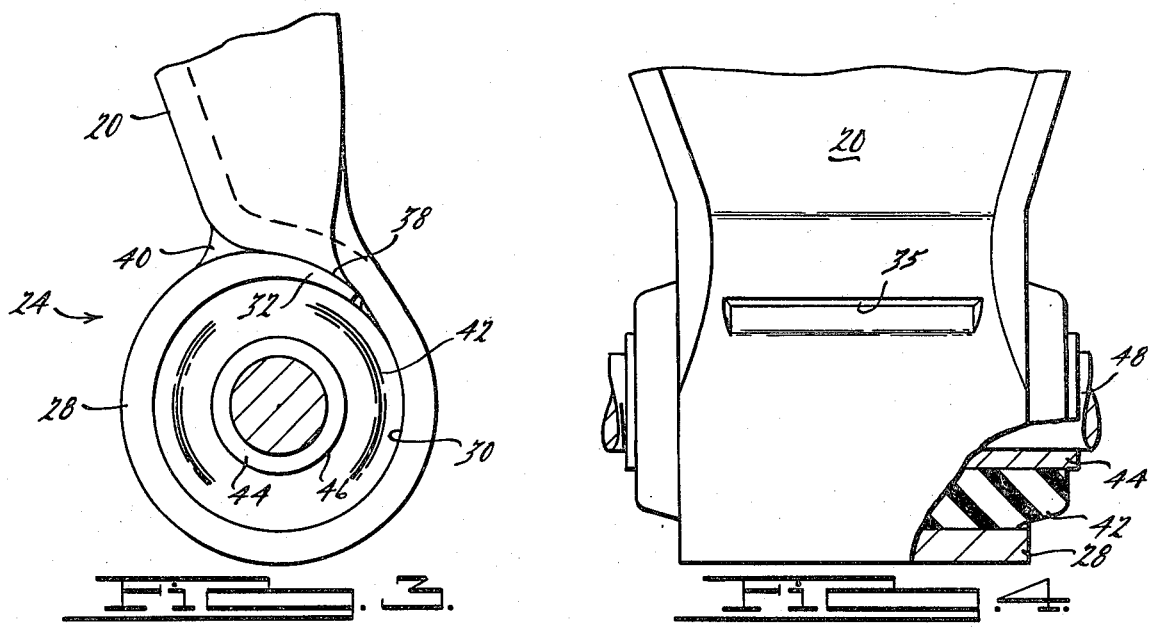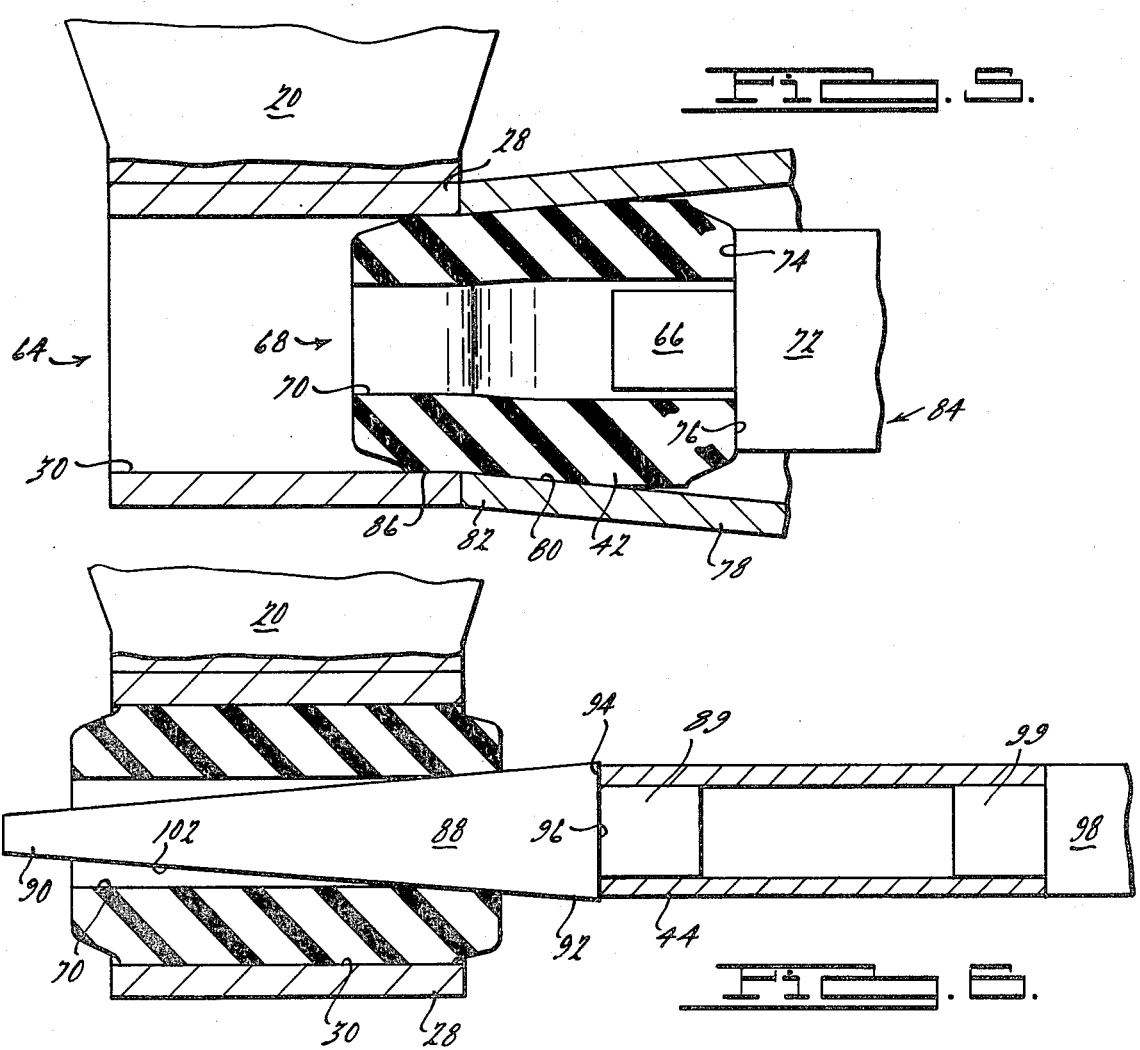

SPRING SHACKLE

BACKGROUND AND SUMMARY OF THE INVENTION

This invention relates to a novel spring shackle for pivotally supporting one end of a spring on a vehicle frame and a method of making the shackle. More specifically, this invention relates to a spring shackle and its method of assembly wherein an elastomeric bushing is employed without a conventional outer metallic sleeve; the elastomeric bushing having an inner metallic sleeve and being inserted directly into a cylinder formed by an end portion of the spring shackle for mounting the shackle to the frame member or spring.

This invention is in the nature of an improvement of the spring shackle disclosed in U.S. Pat. No. 3,030,101 which issued Apr. 17, 1962 to the present inventor. In accordance with the present invention, a spring shackle has a construction providing an end portion formed into a cylinder with a substantially continuous inner surface of substantially uniform radius. By means of this construction a spring shackle can employ an elastomeric bushing assembly without a conventional metallic outer sleeve and several advantages are achieved as set forth in the following objects and description of the invention.

One object of the present invention is to provide a spring shackle requiring fewer parts and having greater design flexibility than conventional spring shackles which employ standard "Silent Bloc" rubber bushing assemblies having metallic outer sleeves, which assemblies are available only in certain sizes. Another object of this invention is to provide a spring shackle more tolerant to slight variations in sizes of its component parts. A further object of this invention is to provide a method for easily and economically manufacturing a spring shackle. Still another object of this invention is to provide a spring shackle having a bushing assembly press fit directly into a cylinder wherein the bushing assembly resists rotation or other movement with respect to the cylinder.

These and other objects, features and advantages of the present invention will become apparent from the subsequent description and the appended claims, taken in conjunction with the accompanying drawings.

BRIEF DESCRIPTION OF THE DRAWINGS

FIG. 3 is an enlarged fragmentary side elevational view of the cylindrical end portion of the spring shackle shown in FIG. 1;

FIG. 4 is an end elevational view, partially broken away, of the cylindrical end portion whown in FIG. 3, looking from the right side;

FIG. 5 is a diagrammatic cross-sectional view showing a cylindrical shackle end portion with an elastomeric member in partial assembly; and FIG. 6 is a diagrammatic cross-sectional view showing a cylindrical shackle end portion, and elastomeric cylinder, and an inner metallic sleeve illustrating a portion of the method of assembly of the present invention.

DESCRIPTION OF THE PREFERRED EMBODIMENTS

Figure 1:
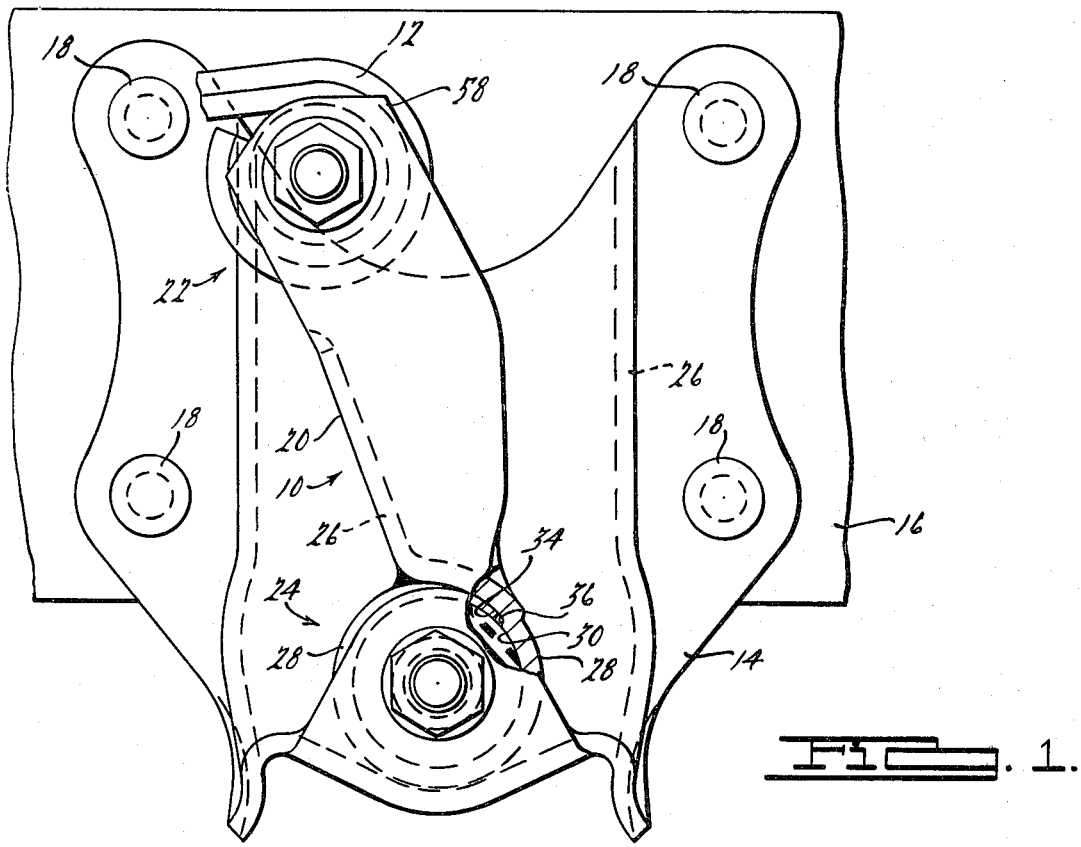
FIG. 1 is a side elevational view, partially broken away, of a spring shackle of the present invention in operative association with a spring and a vehicle frame.
Figure 2:
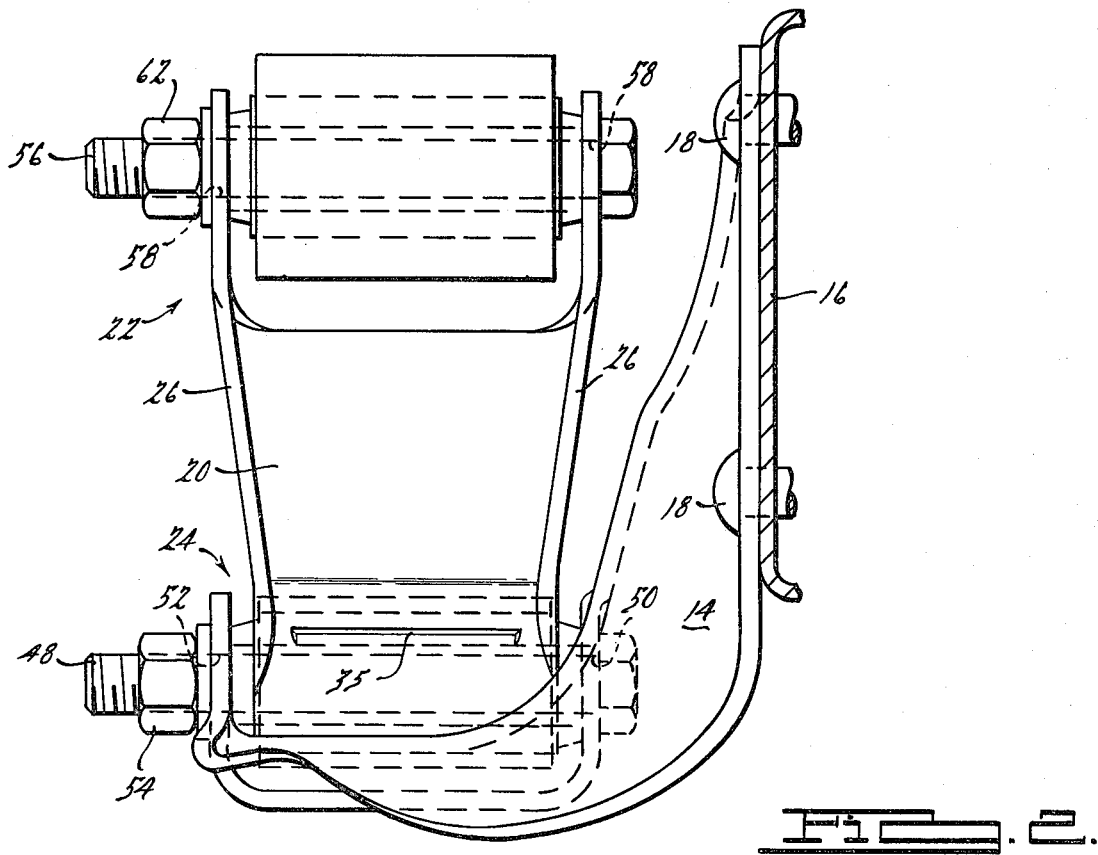
FIG. 2 is an end elevational view, partly in section, of the spring shackle, spring, and vehicle frame shown in FIG. 1.

Now referring to FIGS. 1 and 2, spring shackle 10 supportably extends between a leaf spring 12 and a support bracket 14 which extends from, and is fixedly secured to, a vehicle frame member 16 by rivets 18 or other suitable fastening means. Spring 12, bracket 14 and vehicle frame member 16 are conventional in the art and not described in detail herein, the present invention more specifically relating to an improved structure and method of making spring shackle 10.

It is contemplated that spring shackle 10 will be made from a single stamping of sheet metal having a shackle body member comprising a central body portion 20, an upper end portion 22 and a lower end portion 24. Central body portion 20 has edge flanges 26 and along with upper end portion 22 is conventionally made as taught in U.S. Pat. No. 3,030,101 which issued Apr. 17, 1962 to the present inventor. The present invention relates to an improvement in the construction and method of making lower end portion 24 which is curved or bent in the form of a circular cylinder 28, which construction has attendant advantages as set forth herein. As shown in FIGS. 1 and 3, cylinder 28 is formed by bending lower end portion 24 (an integral extension of portion 20) from the plane of body portion 20 and then reversely curving portion 24 to form a helix defining a cylinder 28 with a substantially continuous inner surface 30 of generally uniform radius. The generally continuous nature of inner surface 30 of cylindrical portion 28 is achieved by tapering free end 32 and bending the metal, as at 36, to provide an offset or recess 34 in the part of lower end portion 24. Recess 34 overlaps free end 32 to receive same in a nested relationship. As seen in FIGS. 2 and 5, recess 34 is formed by bending or swedging the metal in the manner shown at 35. Recess 34 preferably does not extend to the side edges of the shackle because of the weakening effect it could have. Because of the thickness of the metal only a limited amount of offset is possible, so tapered end 32 is an important part of the combination necessary to provide the substantially continuous (uninterrupted) inside surface 30 necessary to accommodate the elastomeric bushing. Lower end portion 24 forms cylinder 28 by curving in a helical-like fashion to provide not only a substantially continuous surface of generally uniform inner radius but also good mechanical strength. Further strength and rigidity is provided by a weld 40 which secures the end of portion 24 to portion 20. One of the significant advantages of this invention is that weld 40 is much more easily made than with the prior construction because the helical-like construction of cylinder 28 eliminates the spring-back problem which creates an excessive gap in the welded version of the prior patented construction.

Another advantage of the present construction is that it provides a shackle body member of high strength which can employ a nonstandard elastomeric bushing having no outer metal sleeve. In accordance with the present invention, an elastomeric bushing 42 is press fit within cylinder 28. Within elastomeric bushing 42, is press fit a metal sleeve 44. Elastomeric bushing 42 is substantially oversize in its unstressed state so that it is highly compressed between outer surface 46 of metal sleeve 44 and inner surface 30 of cylinder 28, and is thereby securely retained therewithin. As a result, rotational or axial movement of elastomeric bushing 42 with respect to cylinder 28 and metal sleeve 44 is substantially eliminated, except by distortion of the elastomeric bushing, which provides the desired mounting characteristics. The nature of the elastomeric materials suitable for use as elastomeric bushing 42, for example synthetic or natural rubber, is such as to frictionally resist movement relative to the supporting structure, while providing the desired tortional dampening characteristics. This, of course, is an advantage over conventional "Silent Bloc" bushings having a metallic outer sleeve which is press fit into a cylinderal portion of a shackle body member, thereby providing a metal to metal interface which has less resistance to relative movement than a metallic-elastomeric interface.

Still another advantage of the present invention relates to the opening of the manufacturing tolerances of cylinder 28. A conventional "Silent Bloc" bushing has a metallic outer sleeve which is press fit into the cylindrical portion of the shackle body member. As will be appreciated by those skilled in the art, the outer metallic sleeve and cylindrical portion must therefore be manufactured to close tolerances in order to obtain a satisfactory press fit. Thus, if the fit is too tight the outer metallic sleeve will buckle when inserted, and if the fit is too loose the metallic sleeve will rotate or slide out. The construction of the present invention allows greater tolerances because elastomeric bushing 42 is fit directly into cylinder 28. The distortion of the compressed elastomeric material is capable of accommodating relatively substantial variations in tolerance, unlike the situation where one metallic member fits into another metallic member. The provision of the taper and recess minimizes the discontinuity in cylinder 28 to thereby prevent damage to bushing 42. The construction of this invention also avoids the use of a detent or the like on the cylindrical portion, which has been used in the past with "Silent Bloc" bushings to prevent movement of the bushing with respect to the cylindrical portion.

As best shown in FIG. 2, spring shackle 10 is conventionally attached to bracket 14 by means of a bolt 48 which extends through metal sleeve 44 and apertures 50 and 52 in bracket 14. Bolt 48 is secured by nut 54 threadedly attached thereto. The upper end of spring shackle 10 is conventionally attached to spring 12 by means of bolt 56 which passes through apertures 58 in upper end portion 22 of spring shackle 10 and spring 12. It will, of course, be appreciated by those skilled in the art that in practical use a spring shackle is employed at each end of spring 12, and further at each end of each similar spring, to support the vehicle frame on the spring members. It will also be appreciated that the respective upper and lower end portions, 22 and 24 of spring shackle 10 can be reversed in some vehicle installations with the advantages of the present invention remaining the same.

The method of making spring shackle 10 is best understood by referring to FIGS. 5 and 6. First, elastomeric bushing 42 is inserted into the interior 64 of cylindrical portion 28, using an arbor 84 comprising a body 72, abutting face 74, and a guide 66 disposed within interior 68 defined by central bore 70 of bushing 42. A funnel 78 having a tapered guide surface 80 is aligned with cylindrical portion 28, its narrow end 82 abutting against portion 28, so that when arbor 84 is urged to the left against face 76, elastomeric bushing 42 is compressed by surface 80 and urged into interior 64 of cylindrical portion 28. Insertion of elastomeric bushing 42 into cylindrical portion 28 may be facilitated by applying a suitable lubricant to interior surfaces 30 and 80 and/or exterior surface 86 of elastomeric bushing 42.

Next, metal sleeve 44 is inserted into the central bore 70 of elastomeric bushing 42 in the following manner. An arbor 98 is provided having a reduced diameter end portion 99 disposed within one end of a metal sleeve 44. Also provided is a nose piece 88 having at one end 90 a diameter less than that of central bore 70 through bushing 42 and tapering outwardly as at 102 to the opposite end 92 which has a face 96 shown in abutting relationship to end face 94 of metal sleeve 44 and at which is disposed a projection 89 disposed within the other end of metal sleeve 44. End 92 of nose piece 88 is of a diameter equal to or slightly greater than that of metal sleeve 44. Assembly is accomplished by moving arbor 98, sleeve 44 and nose piece 88 to the left as shown to cause an enlargement of central bore 70 of elastomeric bushing 42 in order to receive metal sleeve 44. Once fully pushed into place, arbor 98 is withdrawn from one side of metal sleeve 44 and nose piece 88 from the other side. The application of a lubricant to the interior of elastomeric bushing 42 and/or the exterior of the nose piece, metal sleeve and arbor will facilitate the assembly process.

While specific embodiments of the apparatus and method of this invention have been described and illustrated herein, it is to be understood that the present invention may be varied within the scope of the appended claims without departing from the spirit of the invention.

It is claimed:

1. A spring shackle for mounting one end of a suspension spring to a vehicle frame, comprising:
   a body member;
   first mounting means integral with one end of said body member for connecting said shackle to one of said frame or spring;
   second mounting means integral with the opposite end portion of said body member for connecting said shackle to the other of said frame or spring, said second mounting means comprising an integral extension of said body member curving in helical-like fashion and defining a generally cylindrical bore,
   said integral extension having an offset portion defining a recess disposed radially outwardly from said bore and a free end portion, said recess terminating axially at points spaced axially inwardly from the ends of said bore, said integral extension tapering to a reduced circumferential thickness at said free end portion thereof, said free end portion being nestingly disposed in said recess whereby the internal wall of said bore is substantially continuous; and
   an elastomeric bushing press fit into and directly frictionally engaging said bore.

2. The spring shackle as claimed in claim 1, wherein said recess is provided by a bend in said integral extension.

3. The spring shackle as claimed in claim 2, wherein said extension is welded to said body member at a point spaced from said free end portion.

4. The spring shackle as claimed in claim 3, wherein said second mounting means connects said shackle to the vehicle frame.

5. The spring shackle as claimed in claim 4 wherein said elastomeric bushing is formed of rubber.

6. The spring shackle as claimed in claim 2, wherein said elastomeric bushing is formed of rubber.

7. The spring shackle as claimed in claim 1, wherein said extension is welded to said body member at a point spaced from said free end portion.

8. The spring shackle as claimed in claim 1, wherein said elastomeric bushing is formed of rubber.

9. The spring shackle as claimed in claim 1, wherein said second mounting means connects said shackle to the vehicle frame.

10. A spring shackle for supporting one end of a suspension spring on a vehicle frame, comprising:

a body member;

first mounting means integral with one end of said body member for connecting said shackle to a spring; second mounting means integral with the opposite end of said body member for connecting said shackle to a frame, said second mounting means comprising:

an integral extension of said body member curving in helical like fashion and defining a generally cylindrical internal bore, said integral extension having a free end portion tapering to a reduced circumferential thickness;

an offset portion defining a recess disposed radially outwardly from said internal bore, said recess terminating axially inwardly at points spaced axially inwardly from the ends of said bore and having a generally radially inwardly facing wall, said free end portion being nestingly disposed in said recess to provide a substantially continuous, generally cylindrical, internal bore;

said integral extension being welded to said body member at a point spaced from said free end portion thereof; and an elastomeric bushing press fit in and directly frictionally engaging said bore.

* * * * *